2,942,035

PREPARATION OF BENZENE HEXACHLORIDE

Franklin Strain, Norton Center, and William E. Bissinger, Akron, Ohio, assignors to Columbia-Southern Chemical Corporation No Drawing. Filed Nov. 4, 1953, Ser. No. 390,255

2 Claims. (Cl. 260—648)

This invention relates to a novel method of producing benzene hexachloride by addition chlorination of benzene. It is known that chlorine may be reacted with benzene in the absence of a substitution chlorination catalyst under conditions such that the chlorine adds to the double bonds of the benzene ring and forms a chlorinated product by addition of six chlorine atoms. In the past, this process has been conducted in several ways. In U.S. Letters Patent No. 2,010,841, granted to Harry Bender, August 13, 1935, a process has been described wherein benzene is added to liquid chlorine in order to produce benzene hexachloride. In United States Letters Patent No. 2,218,148, granted to Thomas Hardie, October 15, 1940, chlorine gas is led into a body of benzene in the absence of a substitution catalyst. In general both of the above processes and the majority of other processes which have been used or proposed have required activation of the addition reaction by light in the form of actinic light such as ultra-violet light. Such a process is inconvenient and frequently is expensive due to the special equipment which is required to supply the actinic light to the reaction mixture. In the aforesaid patent to Bender it is claimed that the process may be conducted without recourse to actinic light. However, we have found that when this process is conducted at atmospheric pressure, it is unduly slow unless recourse to actinic light is had. Furthermore this process is open to certain disadvantages by reason of the fact that liquid chlorine is required and consequently a very considerable amount of expensive refrigeration is required.

In accordance with the present invention, we have provided a novel process of adding chlorine to benzene, which is simple and inexpensive to perform and which does not require recourse to actinic light. We have found that this addition reaction may be performed by reacting chlorine in elemental state with benzene in the presence of a lower alkyl peroxydicarbonate ester, notably those esters in which the alkyl chain contains 2 to 4 carbon atoms. This reaction may be conducted conveniently simply by mixing the chlorine with the benzene in liquid phase in the presence of the lower alkyl peroxydicarbonate esters. It may be performed at various temperatures, usually below about 60° C. Yields of the order of 75–85 percent of theoretical have been obtained when the reaction has been conducted at temperatures of room temperature and above. Where maximum yield is desired, it is frequently found desirable to operate at a temperature below about 20° C. and not infrequently the reaction is performed using liquid chlorine and liquid benzene at the temperature at which chlorine remains liquid. In such a case, however, the reaction proceeds much more rapidly than when no lower alkyl peroxydicarbonate ester is present despite the fact that the reaction is conducted in the dark and in the absence of actinic light. When the process is conducted at temperatures below about 20° C., the yields normally exceed 90% of the addition product and frequently are as high as 100%. Substantially no chlorination by substitution occurs in such a case.

As previously noted, the process is performed by mixing chlorine and benzene in liquid phase. Thus the benzene may be in liquid state and gaseous chlorine may be bubbled through the benzene containing the peroxydicarbonate at a convenient temperature, usually below 60° C., for example room temperature or below. Alternatively, a pool of liquid chlorine may be condensed into a reactor and liquid benzene may be added from time to time or continuously to the liquid chlorine pool while permitting reflux of chlorine in order to remove the heat of reaction. In this case, the peroxydicarbonate may be dissolved or dispersed in the liquid chlorine pool or it may be dissolved in the benzene which is added to the chlorine. In either case, agitation is generally found to be desirable in order to promote contact between the reactants. As the reaction proceeds, the benzene hexachloride (1,2,3,4,5,6-hexachlorocyclohexane), precipitates in solid state and may be recovered, washed and purified in a conventional manner such as by recrystallization or other convenient method. Inert solvents such as carbon tetrachloride or similar solvent may be introduced into the reaction mixture if desired.

The peroxydicarbonate alkyl esters contemplated in connection with this process are compounds having the probable structure:

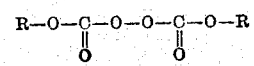

wherein R is the residue of a lower aliphatic monohydric alcohol, notably alcohols containing from 2 to 4 carbon atoms. Of such esters, the isopropyl ester, isopropyl peroxydicarbonate, is preferred.

These esters may be produced by reaction of sodium peroxide with a chloroformate of a lower alcohol in aqueous media usually at 0 to 10° C. These esters may be regarded as esters of the theoretical peroxydicarbonic acid having the theoretical structure.

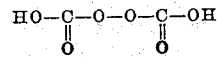

Such esters normally are liquids or low melting white solids which are soluble in organic solvents such as methyl or ethyl alcohol and decompose at relatively low temperatures below about 60° C. Further details concerning the properties of the peroxydicarbonates herein contemplated are given in U.S. Letters Patent 2,370,588 granted to Franklin Strain, February 27, 1945.

As previously noted, the temperature of operation preferably is maintained below about 60° C. Higher temperatures are operative, but it is generally found that the solubility of chlorine in the benzene or similar hydrocarbon is materially reduced at such temperatures. The amount of the lower alkyl peroxydicarbonate ester which is required in order to catalyze this reaction is quite small. In fact even traces have been observed to have an advantageous effect. For most purposes, up to about 5 or 10 percent by weight of the percarbonate is used, based upon the weight of the benzene. However, larger amounts do not appear to be objectionable. In order to ensure the presence of the percarbonate throughout the reaction it frequently is desirable to dissolve the percarbonate in one or both of the reactants and to add the solution to the reacting mixture. In such a case difficulty which might otherwise be encountered, due to premature decomposition and consequent depletion of the peroxydicarbonate will be avoided.

The following examples are illustrative:

Example I

One mol, 78 grams, of benzene was placed in a 500-cubic centimeter, 3-necked flask, which was fitted with a reflux condenser, thermometer and burette. Essentially all light was excluded from the reaction vessel. The flask was warmed to 40° C. and chlorine gas, at a rate of 0.72 gram per minute, was bubbled into the benzene over a period of 295 minutes. At the same time during the chlorine addition, a solution of 0.3% of isopropyl peroxydicarbonate in one mole, 78 grams, of benzene was dropped into the flask at a uniform rate. An exothermic reaction occurred to the extent that cooling with an ice-salt mixture was necessary in order to maintain the temperature of the reaction at about 40° C. As the experiment progressed solid hexachlorocyclohexane (benzene hexachloride) precipitated out. After the addition was complete, unreacted benzene and chlorine were removed by evacuation of the flask to an absolute pressure of 1 to 5 millimeters of mercury. Hexachlorocyclohexane in a substantially pure state was obtained by this process.

When the process of this example was tested using no isopropyl peroxydicarbonate, no reaction took place. The reaction proceeds in the same way when other peroxydicarbonates such as ethyl peroxydicarbonate is used in lieu of isopropyl peroxydicarbonate.

*Example II*

Three mols (212.7 grams) of liquid chlorine was placed in a 500 cubic centimeter, 3-necked flask, fitted with a dry ice-acetone reflux condenser and a burette. The reaction vessel and the reflux condenser were wrapped with aluminum foil in order to exclude all light. The liquid chlorine was allowed to reflux in order to maintain the pool of liquid chlorine at minus 33° C. During this reflux, 39 grams of benzene containing 0.1% by weight of isopropyl peroxydicarbonate was dropped into the chlorine pool over a period of one hour. A vigorous reaction took place and solid hexachlorocyclohexane began to precipitate within 15 to 30 minutes after the initial addition of the benzene solution. The mixture was allowed to reflux for 3 more hours. During the addition and the subsequent period of standing, the temperature of the reaction mixture remained at about minus 30° C. Hexachlorocyclohexane was obtained in a yield of 100%. The exit gases escaping from the reflux condenser were tested for the presence of hydrogen chloride, in order to determine whether chlorine was reacting with the benzene by a substitution reaction. No appreciable hydrogen chloride could be detected.

*Example III*

The precise process of Example II was repeated using ethyl peroxydicarbonate in lieu of isopropyl peroxydicarbonate to prepare high yields of hexachlorocyclohexane.

*Example IV*

The process of Example II was duplicated except n-butyl peroxydicarbonate was used in lieu of isopropyl peroxydicarbonate to prepare high yields of hexachlorocyclohexane.

As shown by the above examples, the herein described process may be performed in the absence of actinic light. However, if desired, the process may be performed while subjecting the reaction mixture to actinic light which, in such case serves as a supplemental means of activating the reaction.

This application is a continuation-in-part of application Serial No. 15,487, filed March 17, 1948.

Although the present invention has been described with reference to the specific details of certain embodiments thereof, it is not intended that such details shall be regarded as limitations upon the scope of the invention except insofar as included in the accompanying claims.

We claim:

1. A method of preparing benzene hexachloride which comprises reacting chlorine and benzene in liquid phase and in the presence of isopropyl peroxydicarbonate.

2. A method of preparing benzene hexachloride which comprises reacting benzene in a liquid pool of chlorine in the presence of isopropyl peroxydicarbonate.

References Cited in the file of this patent

UNITED STATES PATENTS 2,370,588    Strain _____ Feb. 27, 1945

FOREIGN PATENTS 922,275    France _____ Jan. 27, 1847

OTHER REFERENCES

Kharasch: "Jour. Org. Chem.," vol. 6, pages 810–17 (1941).